United States Patent [19]

Itoh

[11] Patent Number: 4,468,098
[45] Date of Patent: Aug. 28, 1984

[54] COMPACT TELEPHOTO ZOOM LENS SYSTEM

[75] Inventor: Takayuki Itoh, Tokyo, Japan

[73] Assignee: Asahi Kogaku Kogyo Kabushiki Kaisha, Tokyo, Japan

[21] Appl. No.: 422,501

[22] Filed: Sep. 23, 1982

[30] Foreign Application Priority Data

Oct. 6, 1981 [JP] Japan .................. 56-159043

[51] Int. Cl.³ ..................... G02B 9/64; G02B 15/14
[52] U.S. Cl. ................................................ 350/427
[58] Field of Search ........................... 350/427

[56] References Cited

U.S. PATENT DOCUMENTS 4,395,092  7/1983  Itoh ..................... 350/427
4,420,226  12/1983  Kitagishi .............. 350/427

Primary Examiner—John K. Corbin
Assistant Examiner—Rebecca D. Gass
Attorney, Agent, or Firm—Sughrue, Mion, Zinn, Macpeak, and Seas

[57] ABSTRACT

A compact high-performance zoom lens system having thirteen lens elements grouped into ten lens components with a rear half of the fourth lens group composed of three lens elements.

2 Claims, 4 Drawing Figures

COMPACT TELEPHOTO ZOOM LENS SYSTEM

BACKGROUND OF THE INVENTION

The present invention relates to a telephoto zoom lens system in a zoom lens for use in 35 mm photographic cameras, the lens system having a zoom ratio of about 3 for covering semi-telephoto and telephoto ranges.

Many telephoto zoom lenses of the type described are known which have a zoom ratio of about 2.5. A telephoto zoom lens according to the present invention has a telephoto ratio (the ratio of the distance between the front lens and the image plane to the focal length at a maximum focal length) of 0.94 for compactness and an increased zoom ratio of about 3, while achieving high performance. A telephoto lens having a zoom ratio of about 2.5 is disclosed in U.S. Ser. No. 240,421, now U.S. Pat. No. 4,395,092, filed by the present applicant. The zoom ratio of disclosed zoom lens is smaller than that of the lens system of the present invention, and the number of lenses is 12 divided into 9 groups while the relay lens system includes a rear group (referred to as "fourth lens group b") composed simply of two-group two-lens elements, with the result that the lens system is of high performance. Japanese Patent Publication Laid-Open No. 56-42208 discloses a telephoto zoom lens having a zoom ratio of about 3. This telephoto zoom lens is composed of nine-group twelve-lens elements or ten-group thirteen-lens elements with the fourth lens group b composed of two-group two-lens elements. However, the telephoto zoom lens fails to achieve high performance since the curvature of field varies widely as the focal length changes. An attempt to make the lens compact in size and correct the curvature of field while maintaining the fourth lens group b of the two-group two-lens type would result in a reduction of the brightness of the marginal portion of the image field or in an increase of coma aberration and distortion.

SUMMARY OF THE INVENTION

The present invention provides a compact, highperformance zoom lens system having thirteen lens elements grouped into ten lens components with a rear half of the fourth lens group composed of three lens elements.

DESCRIPTION OF THE PREFERRED EMBODIMENTS

Figure 1:
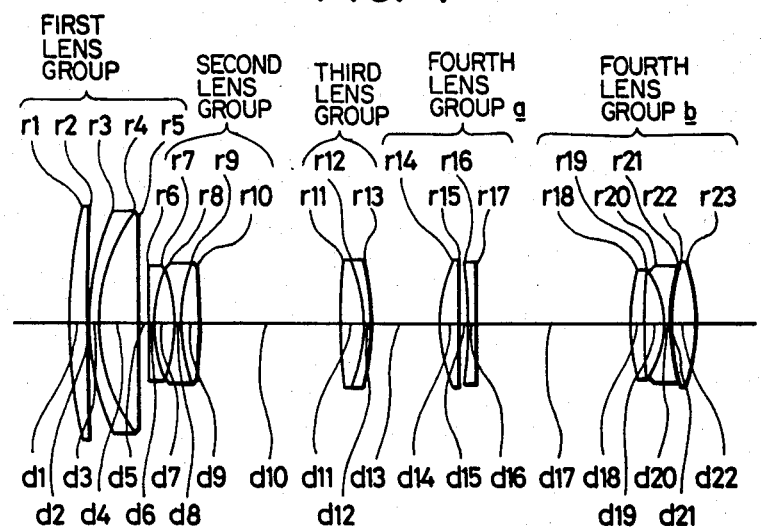
FIG. 1 is a schematic diagram of a lens system at a minimum focal length according to an example of the present invention.
Figure 2A:
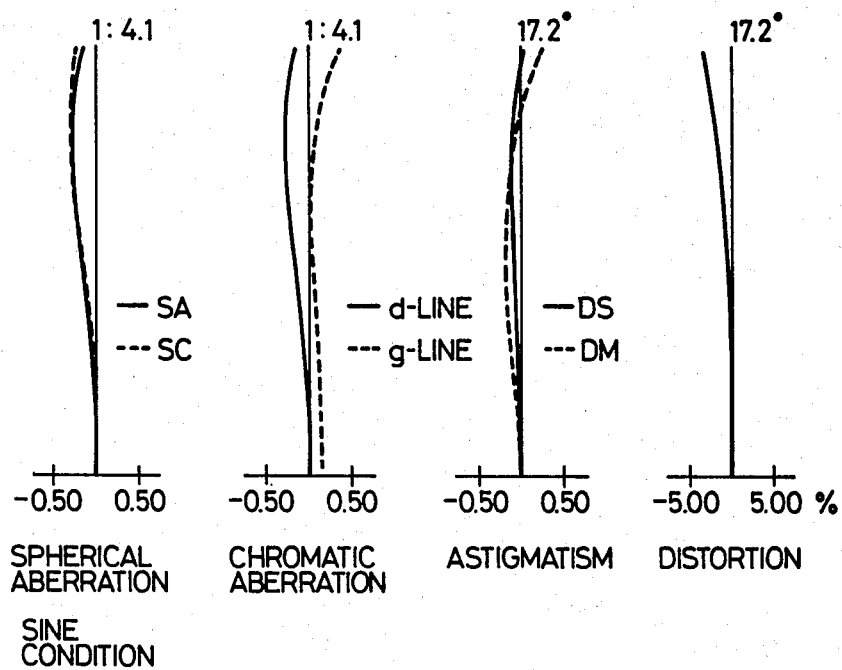
FIGS. 2(a), (b) and (c) are diagrams showing various aberrations of the lens system of the invention, (a) being illustrative of aberrations of the lens system at a minimum focal length, (b) aberrations of the lens system at a medium focal length, and (c) aberrations of the lens system at a maximum focal length, in which designated at $r_i$ is a radius of curvature of each lens surface, and $d_i$ a thickness of a lens or an aerial space between adjacent lens surfaces.
Figure 2B:
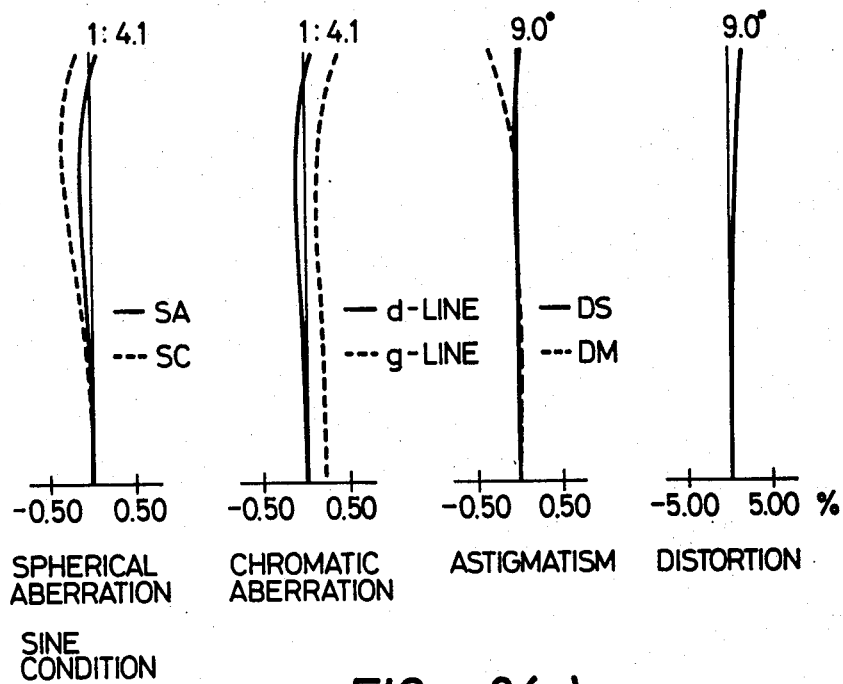
Figure 2C:
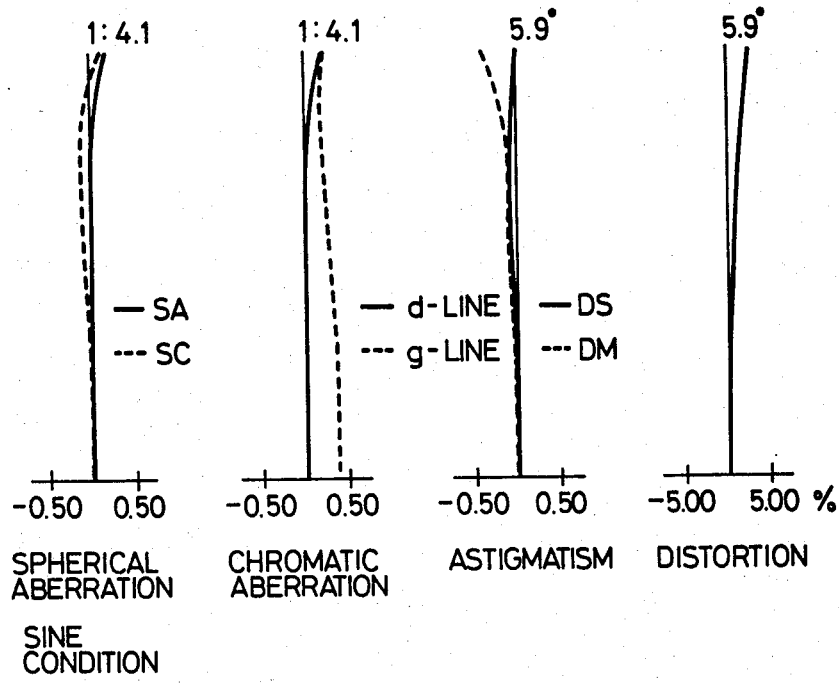

The present invention will now be described in detail. According to the present invention, a compact telephoto zoom lens system comprising a variator unit including a first lens group having a positive focal length and serving as a focusing member, a second lens group having a negative focal length and serving mainly as a variator having a variable power function, and a third lens group having a positive focal length and serving as a compensator for maintaining an image surface constant, and a relay lens unit following said variator unit, said first lens group being composed of a positive lens and a cemented lens assembly of a negative meniscus lens having a convex side direction toward the object and a positive lens, said second lens group being composed of a negative lens and a cemented lens assembly of a biconcave negative lens and a positive lens, said third lens group being composed of a cemented lens assembly of a biconvex positive lens and a negative meniscus lens, said relay lens unit being composed of a fourth lens group a having a positive lens with a large-curvature convex surface directed toward the object and a negative lens, and a fourth lens group b spaced from said fourth lens group a and having a positive meniscus lens, a biconcave negative lens, and a biconvex positive lens.

The lens system according to the invention satisfies the following conditions.

$$0.4 < \frac{f_{min}}{f_I} < 0.9 \tag{1}$$

$$-1.5 < \frac{f_{min}}{f_{I\text{-}II}} < -1.0 \tag{2}$$

$$-0.25 < \frac{f_{min}}{f_{I\text{-}III}} < 0.15 \tag{3}$$

$$1.0 < \frac{f_{min}}{f_{I\text{-}IVa}} < 1.5 \tag{4}$$

$$-0.8 < \frac{f_{min}}{f_{IVb}} < -0.2 \tag{5}$$

$$0.03 < \frac{d_{19}}{f_{min}} < 0.1 \tag{6}$$

$$0 < \frac{f_{min}}{r_{19}} < 1.0 \tag{7}$$

$$0.23 < \frac{|r_{20}|}{f_{min}} < 0.5 \quad (r_{20} < 0) \tag{8}$$

$$1.75 < N_{20} \tag{9}$$

$$0.0 \leq \frac{d_{21}}{f_{min}} < 0.05 \tag{10}$$

$$0.1 < N_{20} - N_{22} < 0.35 \tag{11}$$

where $f_{min}$ is the focal length of the overall system at the minimum focal length, $f_I$ is the focal length of the first lens group, $f_{I\text{-}II}$ is the resultant focal length of the first and second lens groups at the minimum focal length, $f_{I\text{-}III}$ is the resultant focal length of the first through third lens groups at the minimum focal length, $f_{I\text{-}IVa}$ is the resultant focal length of the first group through fourth lens group a at the minimum focal length, $f_{IVb}$ is the focal length of the fourth lens group b, $d_{19}$ is the aerial space between the positive meniscus lens on the object side and the biconcave lens in the fourth lens group b, $r_{19}$ is the radius of curvature of the image side surface of the positive meniscus lens on the object side in the fourth lens group b, $r_{20}$ is the radius of curvature of the object side surface of the biconcave negative lens in the fourth lens group b, $N_{20}$ is the refractive index of the biconcave lens in the fourth lens group b at d-line, $d_{21}$ is the aerial space between the biconcave negative lens and final biconvex lens in the fourth lens group b, and $N_{22}$ is the refractive index of the final biconvex positive lens in the fourth lens group b at d-line.

The above conditions will now be described.

The conditions (1), (2), (3), (4) and (5) relate to the arrangement of the powers of the lens groups. When the upper limit of the condition (1) is exceeded, the lens system becomes smaller in size, but the positive power of the first lens group would be too strong, resulting in an increased change in the spherical aberration with respect to a variation in the focal length and also in an increased change in the spherical aberration when the first lens group is moved for focusing. Inversely, when the lower limit is exceeded, aberrations are well compensated for, but the amount of movement of the front lens group for focusing would be increased. This leads to increases of the overall length of the lens system and the diameter of the front lens.

If the lower limit of the condition (2) is exceeded, the size of the lens system can be small, but the negative power of the second lens group will be excessively large, resulting chiefly in an increase of curvature of field and in remarkable poor performance due to a displacement of the lens groups to the lens barrel. If the upper limit of the condition (2) is exceeded, the variable power will become small so that the amount of movement of the lens groups for zooming is increased. This leads to an increase of the overall length.

The first through third lens groups is similar to an afocal system. If the upper limit of the condition (3) is exceeded, the positive power of the third lens group becomes too strong and its simple construction of one-group two-lens elements would not be effective for aberration compensation. If the lower limit is exceeded, the optical load imposed on the relay lens in the correction of aberrations becomes too large. The front group (fourth lens group a) of the relay lens unit allows a ray of light on the optical axis to pass through a high position in the lens.

When the upper limit of the condition (4) is exceeded, it is difficult to correct the spherical aberration. Inversely, when the lower limit is exceeded, compactness of the lens system is not achieved. Zoom lenses of the class in consideration normally have a focal length up to the fourth lens group a which is substantially equal to the focal length of the overall lens system. According to the present invention, the rear group (fourth lens group b) in the relay lens unit is so designed as to be of a telephoto type in which the focal length up to the fourth lens group a is smaller than the focal length of the overall lens system, so that the lens system is compact in size. Inversely, the fourth lens group b allows a ray of light not on the optical axis to pass through a high position in the lens. If the upper limit of the condition (5) is exceeded, it is difficult to compensate for various aberrations generated up to the fourth lens group a. The aberrations are overcorrected if the lower limit is exceeded.

The conditions (6), (7), (8), (9), (10) and (11) are related to the fourth lens group b. When the upper limit of the condition (6) is exceeded, the spherical aberration would be under. Correction of this aberration requires to increase the power of the biconcave negative lens in the fourth lens group b, resulting in a difficulty to compensate for coma aberration. When the lower limit is exceeded, no peripheral aerial space could be maintained between the positive meniscus lens on the object side and the biconcave negative lens in the fourth lens group b. An attempt to gain such a peripheral aerial space would exceed the lower limit of the condition (7) or the upper limit of the condition (8), a situation which is not preferable from the standpoint of correcting aberrations. With the relay lens unit of the invention being of the telephoto type as described above with reference to the condition (4), if the lower limit of the condition (7) were exceeded, the telephoto function would be too intensive and hence the optical load imposed on the biconcave negative lens in the fourth lens group b would become large, which is not perferable for aberration correction. If the upper limit were exceeded, the advantage gained by the three-group three-lens elements in the fourth lens group b would be reduced, with the result that the lens system would fail of compactness. The condition (8) relates to the first surface of the biconcave lens which is the most important in the fourth lens group b. If the lower limit of the condition (8) were exceeded, the surface power would be excessively strong, and if the upper limit were exceeded, various aberrations produced up to the fourth lens group a could not be compensated for. If the lower limit of the condition (9) were exceeded, the radius of curvature of the first surface of the biconcave negative lens in the fourth lens group b would have to be reduced, resulting in an increase of coma aberration as described with reference to the condition (8). If the upper limit of the condition (10) were exceeded, the diameter of the rear lens (final biconvex lens) would be increased, and aberrations of higher degree would be generated with respect to the second surface of the biconcave negative lens and the first surface of the biconvex positive lens in the fourth lens group b. The lower limit of the condition (10) is a value for preventing the lenses from interfering with each other. The condition (11) is related to the condition (9). If the lower limit of the condition (11) were exceeded, the Petzval's sum of the overall lens system would tend to be of a negative value, and the curvature of field would be liable to be excessive. If the upper limit were exceeded, the curvature of the final biconvex lens would be increased, causing coma to be produced.

Numerical data on an example of the present invention will be described. Designated at f is the focal length of the zoom lens system, $f_B$ the backfocus, $\omega$ the half view angle, r the radius of curvature, d the thickness of the lens element or the aerial space between adjacent lens elements, N the refractive index at d-line, and $\nu$ the Abbe number.

EXAMPLE 1

| | aperture ratio 1:4.1  f = 72.1–204.0 $f_B$ = 42.74  $\omega$ = 17.3° –9.5° | | | |
|---|---|---|---|---|
| No. | r | d | N | $\nu$ |
| 1 | 122.000 | 4.50 | 1.48749 | 70.1 |
| 2 | 946.000 | 0.15 | | |

-continued aperture ratio
1:4.1   f = 72.1–204.0
$f_B$ = 42.74   ω = 17.3°–9.5°

| No. | r | d | N | ν |
|---|---|---|---|---|
| 3 | 63.385 | 2.70 | 1.80518 | 25.4 |
| 4 | 44.014 | 9.30 | 1.48749 | 70.1 |
| 5 | −1800.000 | 1.83–41.04 (variable) | | |
| 6 | 455.000 | 1.60 | 1.77250 | 49.7 |
| 7 | 37.630 | 4.80 | | |
| 8 | −40.196 | 1.50 | 1.72916 | 54.7 |
| 9 | 40.196 | 4.50 | 1.80518 | 25.4 |
| 10 | −173.534 | 32.97–1.32 (variable) | | |
| 11 | 139.000 | 5.80 | 1.56873 | 63.2 |
| 12 | −34.964 | 1.70 | 1.80518 | 25.4 |
| 13 | −62.130 | 16.20–8.64 (variable) | | |
| 14 | 32.540 | 4.70 | 1.56873 | 63.2 |
| 15 | 413.302 | 2.00 | | |
| 16 | −175.741 | 2.30 | 1.80518 | 25.4 |
| 17 | 1889.365 | 36.82 | | |
| 18 | 45.225 | 3.40 | 1.75520 | 27.5 |
| 19 | 135.000 | 4.70 | | |
| 20 | −24.470 | 1.70 | 1.83400 | 37.2 |
| 21 | 73.400 | 0.25 | | |
| 22 | 53.550 | 5.80 | 1.58921 | 41.1 |
| 23 | −45.225 | | | |

$$\frac{f_{min}}{f_I} = 0.673$$

$$\frac{f_{min}}{f_{I \cdot II}} = -1.257$$

$$\frac{f_{min}}{f_{I-III}} = -0.059$$

$$\frac{f_{min}}{f_{I-IVa}} = 1.310$$

$$\frac{f_{min}}{f_{IVb}} = -0.499$$

$$\frac{d_{19}}{f_{min}} = 0.065$$

$$\frac{f_{min}}{r_{19}} = 0.534$$

$$\frac{|r_{20}|}{f_{min}} = 0.339$$

$$N_{20} = 1.834$$

$$\frac{d_{21}}{f_{min}} = 0.0035$$

$$N_{20} - N_{22} = 0.245$$

where
f is the focal length of said zoom lens system,
ω is the half view angle,
r if the radius of curvature,
d is the thickness of the lens element or the space between adjacent lens elements,
N is the refractive index at d-line, and
ν is the Abbe number.

What is claimed is:

1. A compact telephoto zoom lens system comprising a variator unit including a first lens group having a positive focal length and serving as a focusing member, a second lens group having a negative focal length and serving mainly as a variator having a variable power function, and a third lens group having a positive focal length and serving as a compensator for maintaining an image surface constant, and a relay lens unit following said variator unit, said first lens group being composed of a positive lens and a cemented lens assembly of a negative meniscus lens having a convex side direction toward the object and a positive lens, said second lens group being composed of a negative lens and a cemented lens assembly of a biconcave negative lens and a positive lens, said third lens group being composed of a cemented lens assembly of a biconvex positive lens and a negative meniscus lens, said relay lens unit being composed of a fourth lens group a having a positive lens with a large-curvature convex surface directed toward the object and a negative lens, and a fourth lens group b spaced from said fourth lens group a and having a positive meniscus lens, a biconcave negative lens, and a biconvex positive lens, said telephoto zoom lens satisfying the following conditions:

$$0.4 < \frac{f_{min}}{f_I} < 0.9 \tag{1}$$

$$-1.5 < \frac{f_{min}}{f_{I \cdot II}} < -1.0 \tag{2}$$

$$-0.25 < \frac{f_{min}}{f_{I-III}} < 0.15 \tag{3}$$

$$1.0 < \frac{f_{min}}{f_{I-IVa}} < 1.5 \tag{4}$$

$$-0.8 < \frac{f_{min}}{f_{IVb}} < -0.2 \tag{5}$$

$$0.03 < \frac{d_{19}}{f_{min}} < 0.1 \tag{6}$$

$$0 < \frac{f_{min}}{r_{19}} < 1.0 \tag{7}$$

$$0.23 < \frac{|r_{20}|}{f_{min}} < 0.5 \quad (r_{20} < 0) \tag{8}$$

$$1.75 < N_{20} \tag{9}$$

$$0.0 \leq \frac{d_{21}}{f_{min}} < 0.05 \tag{10}$$

$$0.1 < N_{20} - N_{22} < 0.35 \tag{11}$$

where $f_{min}$ is the focal length of the overall system at the minimum focal length,
$f_I$ is the focal length of the first lens group,
$f_{I \cdot II}$ is the resultant focal length of the first and second lens groups at the minimum focal length,
$f_{I-III}$ is the resultant focal length of the first through third lens groups at the minimum focal length,
$f_{I-IVa}$ is the resultant focal length of the first group through fourth lens group a at the minimum focal length,
$f_{IVb}$ is the focal length of the fourth lens group b,
$d_{19}$ is the aerial space between the positive meniscus lens on the object side and the biconcave lens in the fourth lens group b,
$r_{19}$ is the radius of curvature of the image side surface of the positive meniscus lens on the object side in the fourth lens group b,
$r_{20}$ is the radius of curvature of the object side surface of the biconcave lens in the fourth lens group b,
$N_{20}$ is the refractive index of the biconcave lens in the fourth lens group b at d-line,
$d_{21}$ is the aerial space between the biconcave lens and final biconvex lens in the fourth lens group b, and $N_{22}$ is the refractive index of the final biconvex lens in the fourth lens group b at d-line.

2. The zoom lens system of claim 1 satisfying the following chart:

| | aperture ratio 1:4.1 f = 72.1–204.0 $f_B$ = 42.74 ω= 17.3°–9.5° | | | |
|---|---|---|---|---|
| No. | r | d | N | ν |
| 1 | 122.000 | 4.50 | 1.48749 | 70.1 |
| 2 | 946.000 | 0.15 | | |
| 3 | 63.385 | 2.70 | 1.80518 | 25.4 |
| 4 | 44.014 | 9.30 | 1.48749 | 70.1 |
| 5 | −1800.000 | 1.83–41.04 (variable) | | |
| 6 | 455.000 | 1.60 | 1.77250 | 49.7 |
| 7 | 37.630 | 4.80 | | |
| 8 | −40.196 | 1.50 | 1.72916 | 54.7 |
| 9 | 40.196 | 4.50 | 1.80518 | 25.4 |
| 10 | −173.534 | 32.97–1.32 (variable) | | |
| 11 | 139.000 | 5.80 | 1.56873 | 63.2 |
| 12 | −34.964 | 1.70 | 1.80518 | 25.4 |
| 13 | −62.130 | 16.20–8.64 (variable) | | |
| 14 | 32.540 | 4.70 | 1.56873 | 63.2 |
| 15 | 413.302 | 2.00 | | |
| 16 | −175.741 | 2.30 | 1.80518 | 25.4 |
| 17 | 1889.365 | 36.82 | | |
| 18 | 45.225 | 3.40 | 1.75520 | 27.5 |
| 19 | 135.000 | 4.70 | | |
| 20 | −24.470 | 1.70 | 1.83400 | 37.2 |
| 21 | 73.400 | 0.25 | | |
| 22 | 53.550 | 5.80 | 1.58921 | 41.1 |
| 23 | −45.225 | | | |

$$\frac{f_{min}}{f_I} = 0.673$$

| | aperture ratio 1:4.1 f = 72.1–204.0 $f_B$ = 42.74 ω= 17.3°–9.5° | | | |
|---|---|---|---|---|
| No. | r | d | N | ν |

$$\frac{f_{min}}{f_{I\text{-}II}} = -1.257$$

$$\frac{f_{min}}{f_{I-III}} = -0.059$$

$$\frac{f_{min}}{f_{I-IVa}} = 1.310$$

$$\frac{f_{min}}{f_{IVb}} = -0.499$$

$$\frac{d_{19}}{f_{min}} = 0.065$$

$$\frac{f_{min}}{r_{19}} = 0.534$$

$$\frac{|r_{20}|}{f_{min}} = 0.339$$

$$N_{20} = 1.834$$

$$\frac{d_{21}}{f_{min}} = 0.0035$$

$$N_{20} - N_{22} = 0.245$$

where
f is the focal length of said zoom lens system,
ω is the half view angle,
r is the radius of curvature,
d is the thickness of the lens element or the space between adjacent lens elements,
N is the refractive index at d-line, and
ν is the Abbe number.

* * * * *